106798

C. Egnor.

Trap for Lowering Ice etc.

PATENTED AUG 30 1870

Witnesses:
A. Benzenendorf
D. S. Mabee

Inventor:
C. Egnor
per [Attorneys]

United States Patent Office.

CHARLES EGNOR, OF CATSKILL, NEW YORK.

Letters Patent No. 106,798, dated August 30, 1870.

IMPROVED TRAP FOR LOWERING ICE.

The Schedule referred to in these Letters Patent and making part of the same

To all whom it may concern:

Be it known that I, CHARLES EGNOR, of Catskill, in the county of Greene and State of New York, have invented a new and improved Automatic Trap for Lowering Ice, Boxes, &c.; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
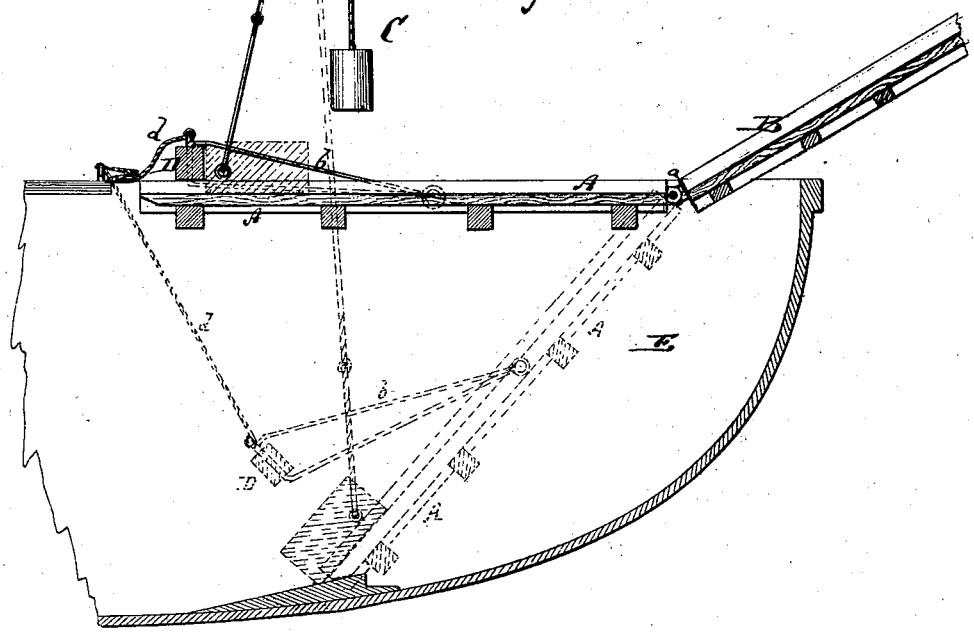
Figure 1 represents a longitudinal section of my improved automatic trap for ice, boxes, &c.
Figure 2:
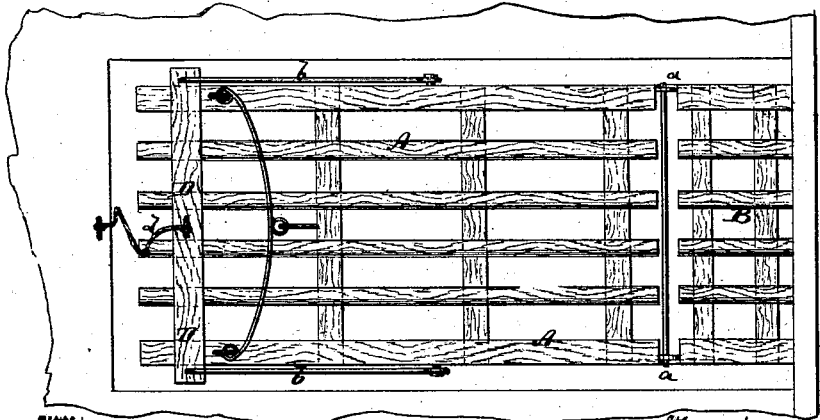
Figure 2 is a plan or top view of the same.

This invention relates to a new apparatus for conveying goods to the holds of vessels or to lower stories of buildings, and is more particularly intended for delivering blocks of ice from the ice-houses to the barges.

The invention consists in the combination of a hinged trap with a swinging end piece, the latter arresting the ice while the trap is being swung down. When the trap is near the lower position the end piece is arrested by a string or cord, and allows the ice to pass under it into the hold of the barge. The same invention, it is evident, can be applied to other articles in all kinds of structures.

A in the drawing represents a slotted or solid platform, made of wood or other suitable material, and hinged at one end at $a$ to an inclined way or bed, B, while its other end is, by a suitable weight, C, elevated to be about on the same horizontal plane with the hinged end.

The swinging end of the platform A supports a cross-bar D, which is secured by arms $b\ b$, that are pivoted to the sides of the platform.

By means of a cord, $d$, the cross-bar D is also connected with a stationary part of the vessel or structure to which the device is applied.

The way B extends from the ice-house to the barge E or other structure, and terminates in the platform A, which is the trap for discharging the ice.

The ice sliding down on the way B arrives at the platform and slides to the front end of the same, where it is arrested by the cross-bar D.

The weight of the ice on the front end of the trap causes the same to swing down, the cross-bar following by its own weight. Upon arriving at the proper depth the cross-bar is arrested by the string $d$, while the trap continues to descend. The ice leaves the trap as soon as it has cleared the cross-bar, as indicated by dotted lines in fig. 1.

As soon as the ice has left the trap the latter is again carried up by the weight into the horizontal position, ready to receive another block.

The operation is extremely rapid, reliable, and safe, the ice being fully preserved from injury.

Instead of being pivoted by arms $b$ the cross-bar may be connected with the platform merely by chains or cords, so as to be retained thereon.

Having thus described my invention,

I claim as new and desire to secure by Letters Patent—

The hinged weighted platform A, combined with the swinging cross-bar D and detaining string $d$, all arranged to operate substantially as herein shown and described.

CHARLES EGNOR.

Witnesses:
A. MELVIN OSBORN,
L. B. CORNELL.